(12) United States Patent
Blenkush

(10) Patent No.: US 7,458,559 B2  
(45) Date of Patent: Dec. 2, 2008

(54) BI-DIRECTIONAL KNIFE GATE VALVE APPARATUS AND METHOD

(75) Inventor: Robert A Blenkush, Sartell, MN (US)

(73) Assignee: SPX Corporation, Charlotte, NC (US)

( * ) Notice: Subject to any disclaimer, the term of this patent is extended or adjusted under 35 U.S.C. 154(b) by 0 days.

(21) Appl. No.: 11/490,251

(22) Filed: Jul. 21, 2006

(65) Prior Publication Data

US 2008/0017825 A1    Jan. 24, 2008

(51) Int. Cl.  
     F16K 3/00    (2006.01)
(52) U.S. Cl. .................... 251/328; 251/326; 251/327
(58) Field of Classification Search ............. 251/326, 251/327, 328, 329  
See application file for complete search history.

(56) References Cited

U.S. PATENT DOCUMENTS

| | | | | |
|---|---|---|---|---|
| 3,580,541 A | * | 5/1971 | Bouhot | ............... 251/174 |
| 4,434,967 A | * | 3/1984 | Vanderburg | .............. 251/328 |
| 4,519,582 A | * | 5/1985 | Freeman | .............. 251/328 |
| 4,846,442 A | * | 7/1989 | Clarkson et al. | .......... 251/328 |
| 5,836,570 A | * | 11/1998 | Blenkush et al. | ........ 251/328 |

* cited by examiner

Primary Examiner—John K Fristoe, Jr.  
(74) Attorney, Agent, or Firm—Baker & Hostetler LLP

(57) ABSTRACT

An improved method and apparatus for a valve assembly features a valve body, a first seat ring mounted in the valve body, a second seat ring mounted in the valve body, and a retractable blade gate slideable in between the first seat ring and the second seat ring. The gate is moveable between open and closed position. A first elastomeric ring is disposed in between the valve body and the first seal ring and projecting towards the gate blade. A second elastomeric ring is disposed in between the second seat ring and the valve body and projecting towards the gate blade.

10 Claims, 5 Drawing Sheets

BI-DIRECTIONAL KNIFE GATE VALVE APPARATUS AND METHOD

FIELD OF THE INVENTION

The present invention pertains generally to fluid control valves, and more particularly, pertains to knife gate valves which use a reciprocating knife gate to selectively close and open a flow passage. More particularly, the invention pertains to a bi-directional knife gate valve.

BACKGROUND OF THE INVENTION

Various valves for fluid control are in wide use in industry. One type of such valve is known as a knife gate valve. In a knife gate valve, a relatively flat knife gate, also referred to as a blade, is translatable back and forth with respect to an aperture in a valve body to open or close a fluid flow passage in the valve body.

Many such knife gate valves are best adapted only for dealing with pressure in a single direction. That is, in such a single direction valve, when the valve is closed the high pressure side will tend to urge or force the blade in the direction towards the low pressure side so that the blade is forced into a seating arrangement against a valve seat that is part of the body. In such a one-directional arrangement, the seating is accomplished by the low-pressure face of the blade being urged into tight contact with the body the low-pressure side of the seat. These single direction knife gate valves are relatively economical and easily to manufacture, because the pressure of the fluid itself helps assist with seating.

A disadvantage with these single direction knife gate valves, however, is that they often are not suitable for use as dual direction valves. Typically, if pressures are reversed from the intended orientation, the blade might be urged away from its seat, and positive closure may not be obtained.

One approach for overcoming this problem has been to form a valve with two seats, one on each side of the blade. However, this can be relatively expensive.

Another approach to creating bi-directional sealing has been the use of a perimeter seal around the perimeter edge of the blade. However, in some applications the perimeter seal also has disadvantages, as far as exposure, complexity and/or durability.

Accordingly, it would be desirable to have an improved knife gate valve assembly and method that can accomplish dual directional flow shutoff when desired. It would also be desirable for such a dual directional knife gate valve assembly and method to be convenient and easy to manufacture, assemble, and maintain.

SUMMARY OF THE INVENTION

Some various embodiments of the present invention can provide a knife gate valve apparatus and method that is capable of sealing in dual directions, that is, with the high pressure side on ether side of the blade, and in some embodiments can overcome the disadvantages mentioned above with respect to the prior art.

In accordance with one embodiment of the present invention, a valve apparatus has a valve body; a first seat ring mounted in the valve body; a second seat ring mounted in the valve body; a retractable blade gate slideable in between the first seat ring and the second seat ring and moveable between open and closed positions; a first elastomeric ring disposed in between the valve body and the first seal ring and projecting towards the gate blade; and a second elastomeric ring disposed in between the second seat ring and the valve body and projecting towards the gate blade.

In accordance with another embodiment of the present invention, a valve apparatus, has a valve body; a first seat ring mounted in the valve body; a second seat ring mounted in the valve body; a retractable closing means slideable in between the first seat ring and the second seat ring and moveable between open and closed positions; a first elastomeric sealing means disposed in between the valve body and the first seal ring and projecting towards the gate blade; and a second elastomeric sealing means disposed in between the second seat ring and the valve body and projecting towards the gate blade.

In accordance with yet another embodiment of the present invention, a method of sealing a valve assembly having a valve body, a first and second seat ring mounted in the valve body, and a retractable blade gate slideable in between the first seat ring and the second seat ring and moveable between open and closed positions, includes disposing a first elastomeric ring in between the valve body and the first seal ring and projecting towards the gate blade; and disposing a second elastomeric ring in between the second seat ring and the valve body and projecting towards the gate blade.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
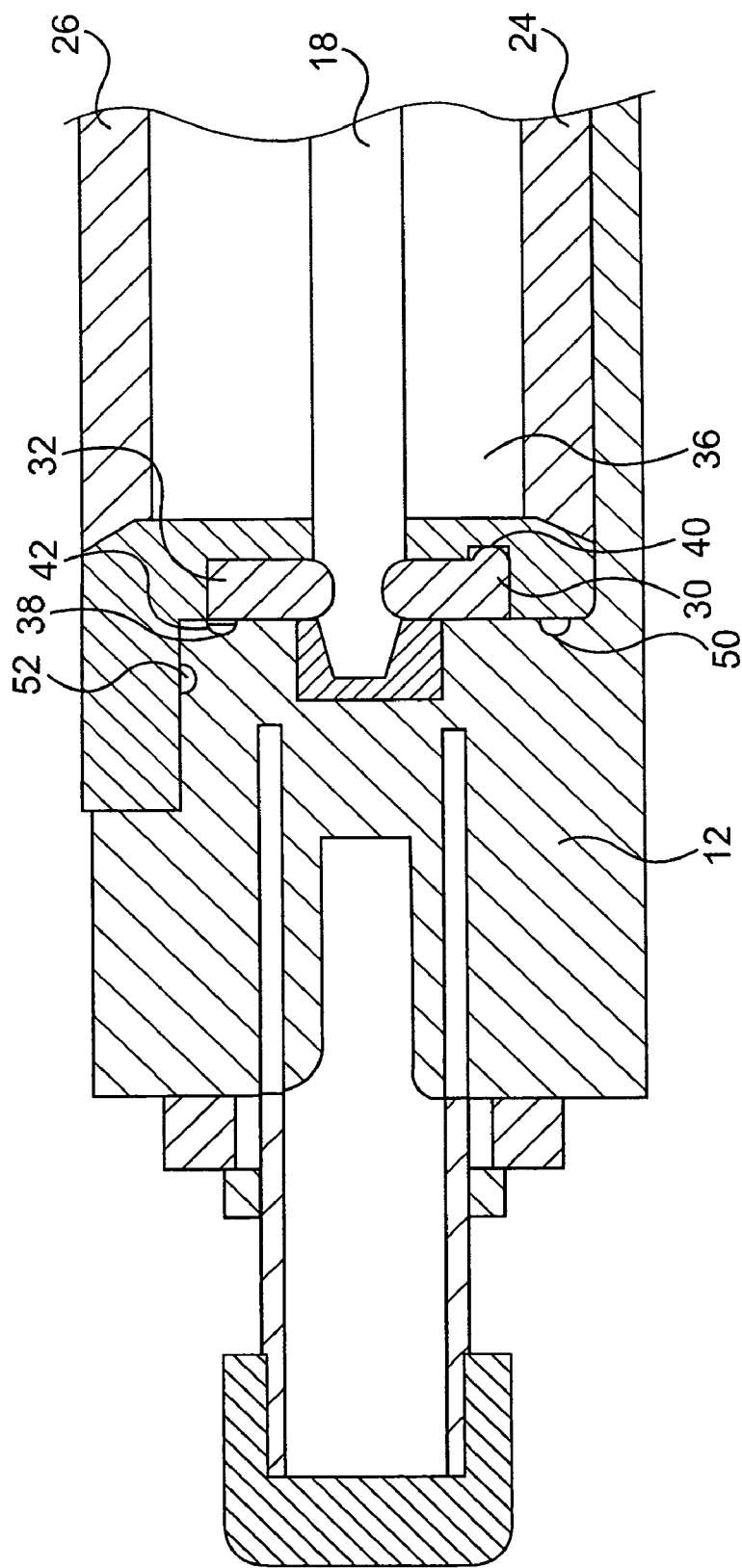
FIG. 1 is a cross-sectional view of a bi-directional knife gate valve assembly according to a first preferred embodiment of the present invention, in a closed position.

Some various embodiments of the present invention can provide a knife gate valve apparatus and method that is capable of sealing in dual directions, that is, with the high pressure side on ether side of the blade, and in some embodiments can overcome the disadvantages mentioned above with respect to the prior art. Some preferred embodiments of the invention will now be described with reference to the drawing figures, in which like reference numerals refer to like parts throughout.

Turning to FIG. 1, a knife gate valve 10 to according to an embodiment of the present invention is illustrated. The knife gate valve 10 can include a valve body 12 that has a flange 14 to which is mounted a packing and stuffing box 16. A knife gate 18, also referred to as a blade 18, has an end 20 protruding from the packing and stuffing box 16. The end 20 of the blade or knife gate 18 can be connected to a reciprocating actuator to extend the blade 18 into the valve to close it, and to extract or retract the blade or knife gate 18 in the opposite direction to open the valve. The blade or knife gate 18 has another end 22, also referred to as a tip, which may be slightly beveled as shown.

The body 12 supports a first metal seat ring 24 and second metal seat ring 26. The first metal seat ring 24 is press-fit into a corresponding groove in the body 12 and retained therein as shown. The second seat ring 26 is press-fit into a corresponding receiving shape in the body 12 and also retained in place. A first elastomeric sealing ring 30 is provided adjacent the first seating ring 24 and a second elastomeric sealing ring 32 is provided adjacent the second seat ring 26.

Figure 2:
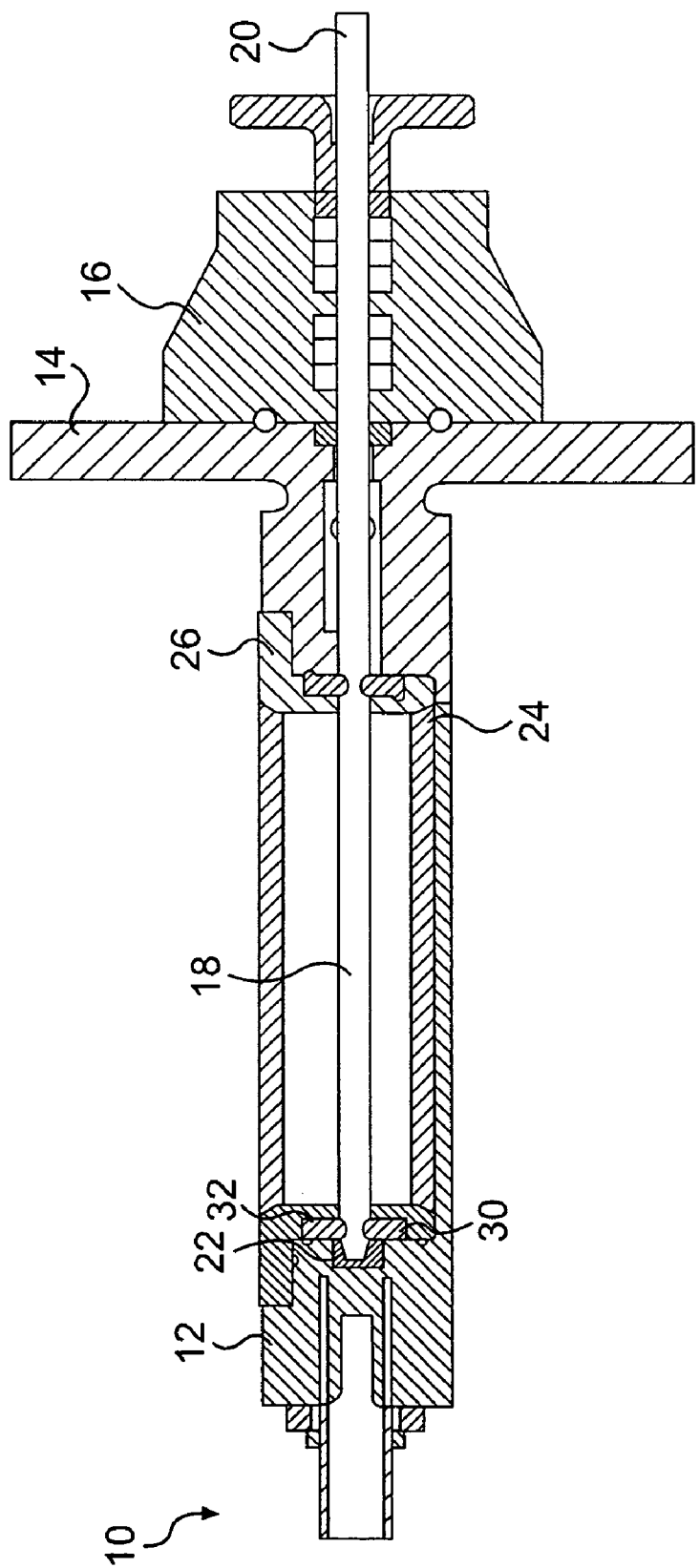
FIG. 2 is a detailed view showing a seat body and blade contact region of the assembly shown in FIG. 1.

Turning now to FIG. 2, a detailed view is illustrated, including the body 12, the lower first seat ring 24, the second seat ring 26, the first elastomeric ring 30 and the second elastomeric ring 32. The blade or knife gate 18 is also illustrated in a closed position.

It will be appreciated that the first and second elastomeric rings 30 and 32 can in fact be similar structures to each other simply having been "flipped" inside out. This provides one advantage of this embodiment of the invention, wherein a single elastomeric ring-type can be manufactured and can be used as both the first and second elastomeric rings 30 and 32 in the preferred embodiment.

The elastomeric rings 30 and 32 can be made by any suitable method, but in one example are made by extruding elastomeric material, then cutting it to a proper length, and then bonding the two ends to form a ring.

Turning, for example, to the first elastomeric ring 30, it will be appreciated that this elastomeric ring 30 has an ear 36. The second elastomeric ring 32 has a similar ear 38. The ear 36 fits in a retention groove 40, and the ear 38 fits in a retention groove 42, with each of the retention grooves 40 and 42 retaining the respective ring via a mechanical fit. The retention groove 40 is a groove formed in the first seat ring 24. The retention groove 42 is a groove formed in the body 12.

The interaction of the ears 36 and 38 with their respective retention grooves 40 and 42 serves one or more of several functions. In particular, the interaction of the ears 36 and 38 with their retention grooves 40 and 42, respectively, serves both to provide some sealing and also to retain the elastomeric rings 30 32 mechanically in their location. For example, this interaction prevents the elastomeric rings 30 and 32 from moving axially and sliding out of their mounted orientation when the valve 10 is open. This can provide an improvement compared to bonding via gluing or another adhesive agent of sealing rings in some cases. The mechanical retention shown in this preferred embodiment can, in some cases, be more durable then bonding or gluing. Also replacement of the elastomeric rings can be accomplished without needing to clean off adhesive residue. However, some embodiments of the invention can use bonding instead of mechanical retention.

The valve 10 also includes a first o-ring 50 and a second o-ring 52, with each o-ring 50 and 52 providing a seal between the body 12 and one of the upper and lower seat rings 24 and 26, respectively. For example, o-ring 50 sits in a channel in the body 12 and seals against the side of the first seat ring 24. O-ring 52 sits in a channel in the body 12 and seals against a face of the second seat ring 26.

It will be appreciated that the combination of the two elastomeric rings 30 and 32 as well as the two O-rings 50 and 52 provides adequate sealing without requiring the blade 18 to necessarily have complete sealing contact with both of the sealing rings 30 or 32 at the same time. That is, in an example where the second seat ring 26 is on the high-pressure side, it will be appreciated that the blade 18 will tend to be urged downward in the drawing figure.

Fluid may tend to leak past the gap between the blade 18 and the seat ring 26. However, such fluid will tend to be stopped by the sealing between the second elastomeric ring 32 and the blade 18. Any fluid that does extend past this seal will, if it is directed upwardly, next tend to be stopped by the mating of the ear 38 and the groove 42, and if any fluid pressure escapes past this seal it will be stopped by the o-ring 52.

The other fluid flow escape path direction is around the tip 22 of the blade 18 and will tend to be stopped by the seal between the first elastomeric ring 30 against the blade 18. Any fluid that does escape past this seal will tend to be stopped by the mating of the ear 36 and groove 40, and also by the o-ring 50.

Therefore, complete sealing by the elastomeric ring against the blade is not required, because secondary sealing is provided by the continuation of the ears and the o-rings.

In one preferred embodiment, the valve body 12 may be made of any suitably rigid structure including, for example, plastic or metal. The first and second seat rings 24 and 26 are typically made of metal, and the knife gate or blade 18 is also typically made of metal. The elastomeric rings 30 and 32, as well as the o-rings 50 and 52, are typically rubber. However, other materials may be utilized as is suitably desired.

Figure 3:
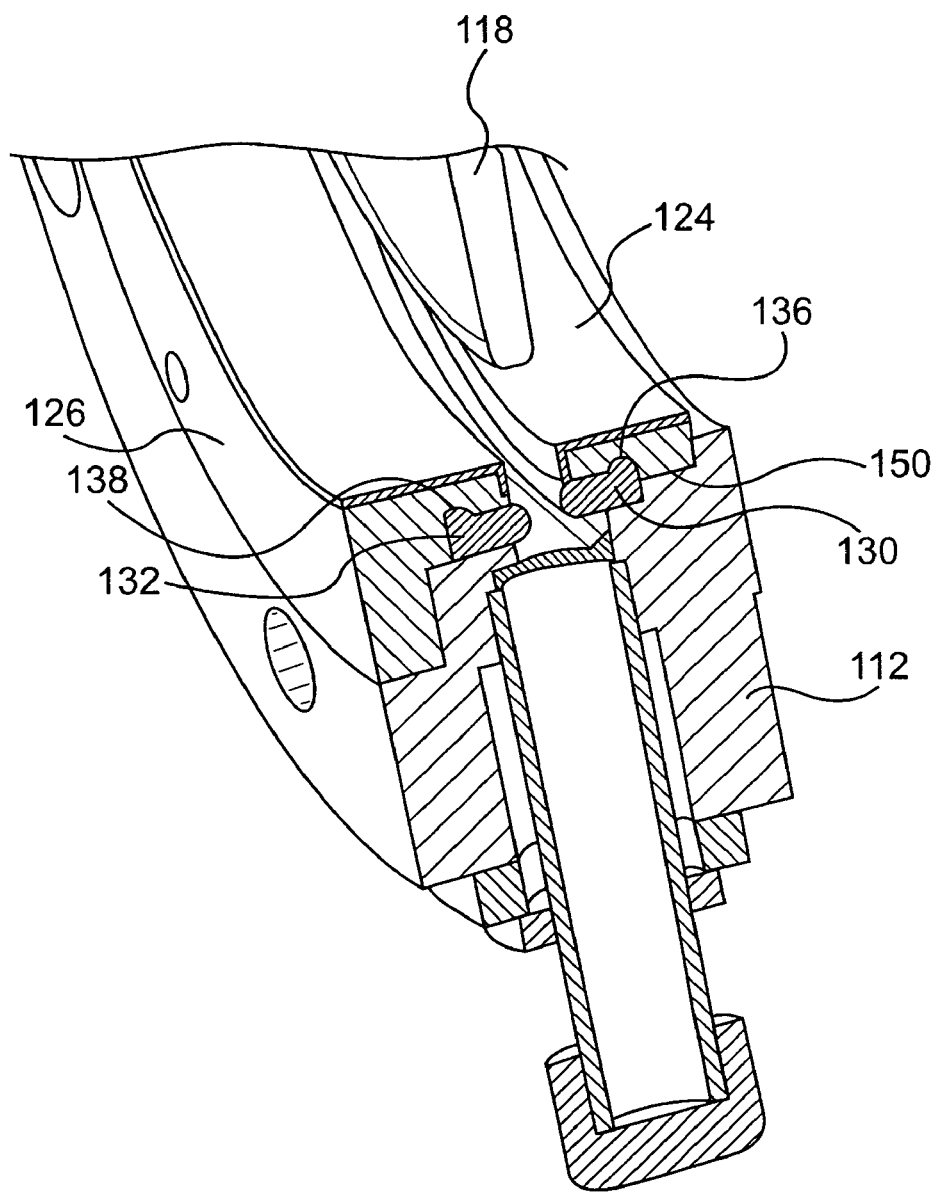
FIG. 3 is a detailed view showing an alternative embodiment of the present invention.

FIG. 3 is a detailed view illustrating a second preferred embodiment of the present invention. The body 112, blade or knife gate 118, and seat rings 124 and 126 substantially correspond to those in the first embodiment. The difference relative to the first embodiment is that the elastomeric rings 130 and 132 are different from each other in this embodiment. That is, rather than there being a single elastomeric ring design, which is flipped inside out depending on its installation, in this embodiment, two structurally different and symmetrically opposed elastomeric rings 130 and 132 are utilized.

In this embodiment, the ears 136 and 138, respectively, are each directed radially inward. Each sits in a groove in its respective seat ring 124 or 126. While this embodiment requires the construction of two different elastomeric ring types, it also provides the benefit that the grooves that receive the ears are located on the seat rings 124 and 126 and there is no need for a retaining groove on the body 112. This permits modification and/or retrofit of existing bodies 112 to have the ear and groove configuration without requiring any changes to the structure of the body 12 itself. Since the seat rings 124 and 126, as well as the elastomeric rings 130 and 132, are replaceable components (compared to the body 112), this can provide an advantageous future in some situations.

Figure 4:
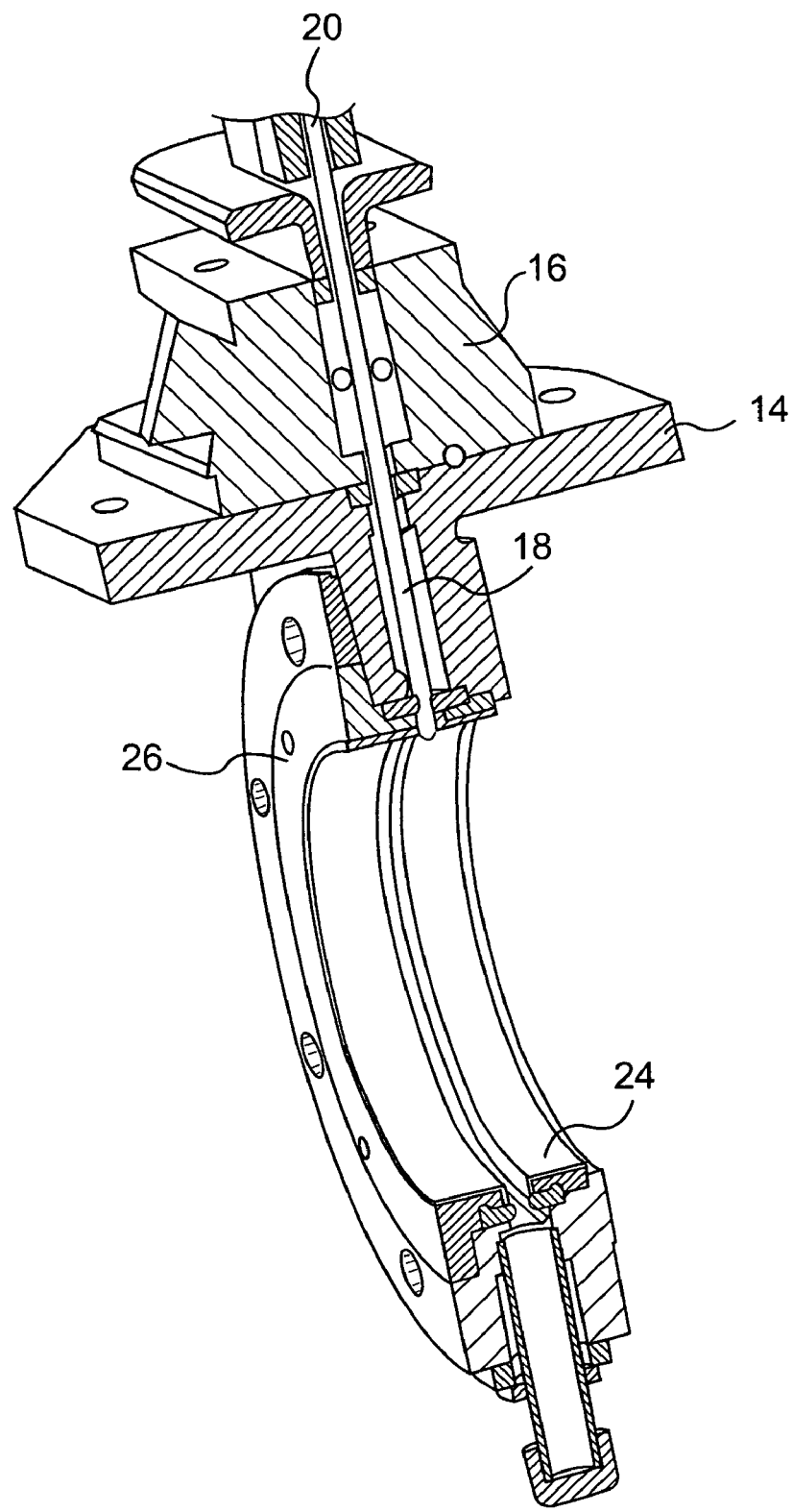
FIG. 4 is a view similar to FIG. 1 relevant to either embodiment and showing the valve in an open position.

FIG. 4 is a view showing the valve of either embodiment in an open configuration. In FIG. 4 the elastomeric rings are shown schematically without detail; in the first embodiment, the ears would face in different directions, and in the second embodiment, they would both face radially inward.

Figure 5:
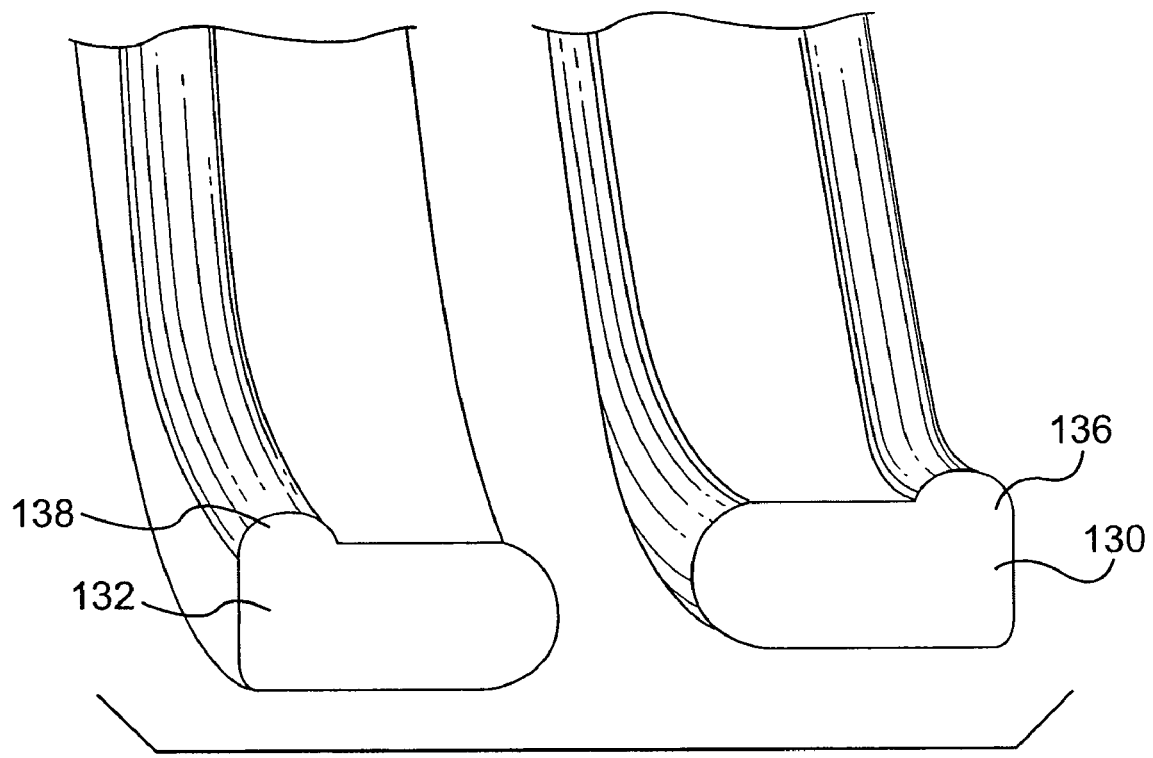
FIG. 5 is cross-sectional view showing two different elastomeric rings according to the alternative embodiment illustrated in FIG. 3.

FIG. 5 shows the two different elastomeric ring cross-sections of the second preferred embodiment, depicting elastomeric rings 130 and 132 as well as their inwardly directed ears 136 and 138.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A valve apparatus, comprising:
   a valve body;
   a first seat ring mounted in the valve body to define with the valve body a first retention groove having a first ear groove portion;
   a second seat ring mounted in the valve body to define with the valve body a second retention groove having a second ear groove portion;
   a retractable blade gate slidable along a linear axis in between the first seat ring and the second seat ring and movable along the linear axis between the enclosed positions;
   a first elastomeric ring held by and projecting from the first retention groove between the valve body and the first seal ring, and having one end projecting towards the gate blade, and another end having a first ear that projects into the first ear groove portion, wherein removal of the elastomeric ring from the first retention groove is inhibited by the interaction of the first ear and the first ear groove portion; and
   a second elastomeric ring held by and projecting from the second retention groove between the valve body and the second seal ring, and having one end projecting towards the gate blade, and another end having a second ear that projects into the second ear groove portion, wherein removal of the elastomeric ring from the first retention groove is inhibited by the interaction of the second ear and the second ear groove portion,
   wherein the first ear projects in a first projection direction which is parallel to the linear axis, and wherein the second ear projects in a second direction which is also parallel to the linear axis but is in the opposite direction, and wherein the first and second elastomeric rings have the same structure as each other, with the second elastomeric sealing ring being flipped inside-out compared to the first elastomeric sealing ring.

2. The apparatus according to claim 1, further comprising a first o-ring between the body and the first seat ring.

3. The apparatus according to claim 2, further comprising a second o-ring between the body and the second seat ring.

4. The apparatus according to claim 1, further comprising a first o-ring between the body and the first seat ring.

5. The apparatus according to claim 4, further comprising a second o-ring between the body and the second seat ring.

6. A valve apparatus, comprising:
   a valve body;
   a first seat ring mounted in the valve body to define with the valve body a first retention groove having a first ear groove portion;
   a second seat ring mounted in the valve body to define with the valve body a second retention groove having a second ear groove portion;
   a retractable blade gate slidable along a linear axis in between the first seat ring and the second seat ring and movable along the linear axis between the enclosed positions;
   a first elastomeric sealing means held by and projecting from the first retention groove between the valve body and the first seal ring, and having one end projecting towards the gate blade, and another end having a first ear that projects into the first ear groove portion, wherein removal of the elastomeric sealing means from the first retention groove is inhibited by the interaction of the first ear and the first ear groove portion; and
   a second elastomeric sealing means held by and projecting from the second retention groove between the valve body and the second seal ring, and having one end projecting towards the gate blade, and another end having a second ear that projects into the second ear groove portion, wherein removal of the elastomeric sealing means from the first retention groove is inhibited by the interaction of the second ear and the second ear groove portion,
   wherein the first ear projects in a first projection direction which is parallel to the linear axis, and wherein the second ear projects in a second direction which is also parallel to the linear axis but is in the opposite direction, and wherein the first and second elastomeric sealing means have the same structure as each other, with the second elastomeric sealing means being flipped inside-out compared to the first elastomeric sealing means.

7. The apparatus according to claim 6, further comprising a first o-ring between the body and the first seat ring.

8. The apparatus according to claim 7, further comprising a second o-ring between the body and the second seat ring.

9. The apparatus according to claim 6, further comprising a first o-ring between the body and the first seat ring.

10. The apparatus according to claim 9, further comprising a second o-ring between the body and the second seat ring.

* * * * *